United States Patent [19]
Horvat et al.

[11] Patent Number: 5,336,307
[45] Date of Patent: Aug. 9, 1994

[54] MARKER PENCIL

[75] Inventors: Ivan Horvat, Weissenburg; Manfred Schweizer, Eckenhaid; Thomas Stoecklein, Nuremburg, all of Fed. Rep. of Germany

[73] Assignee: Schwan-Stabilo Schwanhaeusser GmbH & Co., Nuremburg, Fed. Rep. of Germany

[21] Appl. No.: 42,610

[22] Filed: Apr. 2, 1993

[30] Foreign Application Priority Data

May 19, 1992 [DE] Fed. Rep. of Germany ....... 4216497

[51] Int. Cl.⁵ .............................................. C09D 13/00
[52] U.S. Cl. .................... 106/19 B; 106/19 C; 106/19 E; 106/22 F; 106/27 R; 106/28 A; 401/82
[58] Field of Search ................ 106/19 B, 19 C, 19 E, 106/27 R, 28 A, 22 F; 401/82

[56] References Cited

U.S. PATENT DOCUMENTS

| | | | |
|---|---|---|---|
| 2,365,802 | 12/1944 | Browse | 401/82 |
| 3,360,489 | 12/1967 | Grossman et al. | 106/19 B |
| 3,861,943 | 1/1975 | Grainger | 106/19 C |
| 4,256,492 | 3/1981 | Matsumoto et al. | 106/22 F |
| 4,461,496 | 7/1984 | Ludwig | 106/27 A |
| 4,500,221 | 2/1985 | Emerson | 401/82 |
| 5,169,439 | 12/1992 | Horvat et al. | 106/22 F |

FOREIGN PATENT DOCUMENTS

| | | |
|---|---|---|
| 3421408 | 1/1986 | Fed. Rep. of Germany . |
| 58-162673 | 9/1983 | Japan ..... 106/28 A |

*Primary Examiner*—Anthony Green
*Attorney, Agent, or Firm*—Bachman & LaPointe

[57] ABSTRACT

A marker pencil comprises a gel-like water-bearing pencil material enclosed in a casing and incorporating a dye carrier. The structure-forming constituents of the pencil material include water-soluble metal soaps and saccharides and/or polyols derived therefrom by reduction. As a further alternative constituent the pencil material may include a fatty substance.

16 Claims, 1 Drawing Sheet

MARKER PENCIL

BACKGROUND OF THE INVENTION

Many different designs of marker pencils for producing colored lines and markings and the like are known. In regard to the configuration of their writing member which comprises a solid material, a distinction is to be made between lead pencils and chalks. Thus for example while colored pencils have a thin lead which is enclosed and supported by a casing, colored chalks do not require such a casing by virtue of their substantially greater thickness, in comparison with colored pencils, the thickness of chalks being for example about between 7 and 10 mm.

The lead and chalk materials of marker pencils and chalks, besides a coloring agent or dye carrier, also contain a binding agent and a lubricating and adhesive substance, while various filler substances may also be added. The binding agent, for example cellulose derivatives and plastic materials, afford the leads and chalks adequate strength, that is to say a degree of strength which withstands the pressure applied thereto in situations of use. The lubricating and adhesive substances ensure that the pencil can glide smoothly over the surface of the item or material on which a marking is to be produced, for example the surface of a sheet of paper, while producing a marking which adheres firmly to that surface. For that purpose the leads may be impregnated with a grease or fatty substance. In the case of the leads or pencil leads which are referred to as wax pencils or wax pencil leads and also in the case of chalks, the fatty substances such as paraffin, animal and vegetable fats, Japan wax, stearines or synthetic waxes are incorporated into the pencil lead material. Besides the fatty substances, the pencils or pencil leads may also include water-soluble and/or water-insoluble metal soaps in order to improve the slidability of the pencil. If the metal soaps are water-soluble, they also act as an emulsifier for the fatty substances, but they do not represent a structure-forming constituent for the lead or the pencil.

The emulsifier effect of the metal soaps is however restricted to the manufacturing process as the water which is temporarily present in the pencil or lead material, by virtue of the deformability thereof, is removed after the shaping operation, by drying at elevated temperature.

It is possible to modify the physical properties and in particular the hardness of the pencil or the pencil lead by virtue of a suitable selection of the binding agent and the fatty substances used. The coloring effect produced substantially depends on the chemical composition of the pencil material, in which respect an important consideration is that the marking which is left behind on the paper is intensively colored.

Colored leads and colored chalks are basically produced by a procedure in which solvents (water or mixtures of water with water-soluble organic solvents) are added to dry pencil material in order to impart thereto a consistency which is required for shaping by means of extrusion or screw-pressing, and the extruded material is then cut to the desired length and then dried. Lead materials with a higher content of fats and waxes can be formed into elongate portions by known extrusion processes, without the addition of solvents, and then cut to the desired length. The extrusion operation may possibly be carried out at elevated temperature.

Although the writing properties of the above-described marking pencils may be modified to a certain extent by varying the proportions and the chemical composition of the above-mentioned base constituents and also by the addition of auxiliary constituents, for many purposes the marking effect of even those pencils which are adjusted to have a low level of hardness is still found not to be sufficiently soft. That would also apply for example in the situation where a marker pencil of the above-described kind incorporated a fluorescent dye carrier such as for example a daylight fluorescent dye with which written text on an article such as a sheet of paper is to be particularly emphasised by rubbing the pencil over same. The color or fluorescent effect would also suffer from the point that, when using such a pencil, too little pencil material and thus also an inadequate amount of dye carrier is applied to the paper.

For that reason, hitherto marker pens have been used for the last-mentioned purpose, which comprise a housing which accommodates a dyestuff solution (ink) and a capillary storage member for the solution, and a capillary member for conveying the dyestuff solution from the interior of the housing outwardly and for applying it to the paper. In that situation the liquid discharge of the dyestuff is found to be more pleasant and agreeable in comparison with the above-described colored lead pens and colored chalks, in particular when the marking to be produced is to be particularly wide and the capillary writing tip is made from a soft material.

However, in order for the tip of the marker to enjoy sufficient strength throughout the entire period of use of the marker, particularly when such tips are used in a refillable marker pencil, the tips have to be made from a suitable, preferably sintered plastic material. That however means that although such writing tips are resilient, they do however present a certain degree of basic hardness which excludes permanent deformation of the tip.

If a marker of that kind is used to cover a large wide area for example on a sheet of paper, as is frequently required by artists and in graphic design, then the use of such markers frequently results in the coloring effect being stripey and streaky and generally uneven, which is undesirable. That then does not provide a uniform even marking.

When a dye pigment which is dispersed in the fluid is used, problems can arise due to blockage of the capillaries of the applicator member. Finally, the plastic components which are used in liquid markers, such as the housing, storage member and applicator member, which generally involve different kinds of plastic materials, give rise to a relatively high level of expenditure on material and thus a relatively high level of overall costs, while in addition causing major problems in regard to disposal and in particular in regard to recycling the different kinds of plastic materials. Conventional liquid markers can hitherto only be subjected to energy recycling by way of a refuse incinerator installation.

SUMMARY OF THE INVENTION

An object of the present invention is to provide a marker having a dye carrier such as a dyestuff or pigment which is uniformly distributed or homogeneously dissolved in the pencil material by being incorporated therein.

Another object of the present invention is to provide a marker pencil which in comparison with known colored leads and chalks permits a much softer and also thicker application of markings to a surface such as paper.

Still another object of the present invention is to provide a marker which is also suitable for use on smooth surfaces such as for example paper with a substantial coating of size thereon or high-glaze paper or foil for daylight projectors as well as metal, plastic material and even skin.

Still another object of the present invention is to provide a marker by means of which a fluorescent dye and more especially a daylight fluorescent dye can be applied as a marking to a surface in order to particularly emphasise for example written texts or the like already on that surface by highlighting same.

In accordance with the present invention, the foregoing and other objects are achieved by a marker pencil or marker comprising a marking pencil material which is enclosed in a casing and into which a dye carrier is incorporated. The pencil material contains at least one water-soluble metal soap and mono- and/or oligo-saccharide and/or polyol derived therefrom by reduction as structure-forming constituents which, together with a water component contained in the pencil material, form a gel-like structure.

When in connection with the invention reference is made to a gel-like structure, it will be appreciated that this refers only to its stable and easily deformable consistency, and not to a structure which is characteristic of a colloid system.

The constituents of the pencil material are preferably so matched to each other that the pencil material has thixotropic properties.

The material contained in the marker pencil according to the invention is of a composition or structure which is completely different from the above-discussed prior colored pencils and leads.

In order further to improve the adhesion of the pencil marking produced with the marker pencil according to the invention and to reduce the drying time of the marking, the invention in a preferred feature provides that the pencil material, as a further structure-forming constituent, contains fatty substances such as fat-like substances and/or waxes or wax-like substances. The addition of such fatty substances provides that the markings produced are more quickly resistant to being wiped off, particularly upon being applied to a surface which is non-absorbent or only slightly absorbent. The proportions of the constituents of the pencil material are preferably so matched to each other that the pencil can be used on a writing substrate such as a sheet of paper, with a soft action, while leaving behind a wide coherent marking.

By virtue of its structure which is defined by the combination of metal soap/saccharide/polyol, the marker pencil according to the invention has writing or marking properties which can be considered as lying between those of the above-mentioned liquid markers and solid colored pencils and chalks, while the marking effect produced is noticeably softer and smoother, so that the marker pencil glides easily over the surface to which the marking is to be applied, and is in particular more uniform and more intensive in color, both in comparison with liquid markers and also colored pencils and chalks.

Particularly good results and pencil properties are achieved if the proportion of water-soluble metal soap in the pencil material is between about 5 and 40% by weight, preferably between 8 and 20% by weight. When using a fat-bearing pencil material, it is found to be advantageous for the amount of metal soap used to be matched to the proportion of fatty substance. In that respect the ratio of soap: fatty substance is generally between 2:1 and 2:3, preferably 3:2 and 1:1. In the pencil material according to the invention the water-soluble metal soap not only acts as an emulsifier for fatty substances contained therein, but it also represents a structure-forming constituent for the finished pencil.

Preferably the proportion of saccharide or polyol in the pencil material according to the invention is between about 5 and 50% by weight, preferably between about 25 and 40% by weight. The amount of saccharide or polyol in the pencil material generally predominates over the proportion of metal soap; the ratio of saccharide or polyol: metal soap is advantageously between about 1:1 and 5:1, preferably between about 2:1 and 3:1. The total of the proportions of metal soap and saccharide in the pencil material should be at least about 40% by weight and preferably about 50% by weight.

The amount of water in the pencil material according to the invention is general between about 15 and 65% by weight, preferably between about 30 and 40% by weight. In contrast to the production of the solid pencil leads referred to above, which contain fatty substances and metal soaps, the procedure for the production of the pencil material according to the invention does not involve removing the water from the pencil material after shaping thereof, which also contributes to the marker pencil according to the invention having writing and marking properties which are not comparable to the known pencil leads.

The properties of the pencil material can be modified in various ways by admixing a water-soluble organic solvent with the water. Thus the addition of a glycol compound such as for example ethylene, propylene, butylene, diethylene or triethylene glycol imparts a transparent writing characteristic to the pencil material. In this respect the use of 1,2-propylene glycol has proven to be particularly advantageous.

The proportion in the pencil material according to the invention of dyestuff or pigment, which may be soluble, is generally between about 0.1 and 10% by weight, preferably between about 0.5 and 5% by weight. Very bright dyestuffs or pigments are preferred in this respect. The materials used may also include organic dye pigments which are contained in aqueous plastic material dispersions, in which the actual dye carrier is bonded to the dispersed plastic material particles. The desired amount of water can be introduced into the pencil material at the same time when using a dispersion.

The marker pencil according to the invention can be used as an alternative to liquid markers if the pencil material incorporates a fluorescing dyestuff, more especially for example a daylight fluorescent dye such as for example hydroxy pyrene trisulfonic acid (Pyranine C.I. Solvent Green 7 No. 59.040) or C.I. Basic Violet 10 No. 45.170 (Rhodemine B).

If fatty substances are to be included in the pencil material according to the invention, the proportion thereof is generally between about 5 and 25% by weight, preferably between about 8 and 15% by weight. The fatty substances used may be natural waxes such as beeswax, Japan wax, carnauba wax or synthetic imitations comparable thereto (commercially available beeswax and Japan wax substitutes) based on paraffins and natural or synthetic triglycerides, which are suitably incorporated into the pencil lead material. Further suitable fatty substances for that purpose are also solid triglycerides of $C_{18}$–$C_{36}$ fatty acids, liquid triglycerides of $C_6$–$C_{10}$ fatty acids (referred to as neutral oils) and stearines. An addition of paraffin oil has also been found to be suitable. Vegetable oils with iodine values of over 60 are less suitable if the aim is to achieve very good resistance to being wiped off.

Besides improving the resistance to being wiped off, incorporation of fatty substances into the pencil material also promotes quick drying of the marking produced by the marker.

If no fatty substance is added to the pencil material, a particularly pronounced thixotropic effect is observed when the marker pencil is used to apply a marking to a writing substrate such as a sheet of paper, that is to say the pencil lead liquefies under a pressure applied thereto. That pronounced thixotropic effect results in the marker pencil having a very pleasant feel when it is used for writing, marking and so forth. It will be appreciated in that respect that a lower level of resistance to being wiped off and slower drying of the markings produced have to be accepted, in particular when the marker pencil is being used on a smooth surface.

The metal soaps which are involved in forming the pencil structure according to the invention are preferably alkali metal soaps, more preferably sodium and potash soaps of higher fatty acids, in particular stearic, palmitic and oleic acids and mixtures thereof. It has also been found that sodium and potash soaps of behenic and erucic acids are suitable.

As the specified soaps have an alkaline reaction in aqueous solution, it is possible in accordance with the invention for them to be used in a particularly effective manner with those dyestuffs which, like for example pyranine, require an alkaline medium for developing their luminosity.

The consistency of the pencil material according to the invention can be regulated by suitable qualitative and quantitative selection of the soaps. When using for example sodium stearate as the sole or predominant soap constituent, a comparatively firm structure is obtained, which however can be made softer by adding at least one potash soaps of saturated and/or unsaturated fatty acids, for example potassium oleate. Potassium stearate and sodium and potassium oleate alone are not so highly suitable for the purposes according to the invention. Potassium stearate and oleate produce pencil leads of a pronouncedly soft consistency while sodium oleate gives pencil leads which are almost as flexible as rubber.

The action of the other basic constituent of the pencil material according to the invention, that is to say the saccharide or the polyol derived therefrom by reduction is manifested in a clear structuring effect which is possibly caused by secondary valence bonds between the carboxyl group of the fatty acids and the hydroxyl groups of the saccharide or polyol. When there is a marked excess of saccharide or the polyol derived therefrom by reduction, the adhesive properties of that group are particularly pronounced. However the saccharides or polyols also have the effect of increasing luminosity and light-fastness, as described in U.S. Pat. No. 5,169,439 for use thereof in a liquid marker containing a pyranine solution. In principle any mono- and oligo-saccharides such as for example di- and trisaccharides and the polyols derived therefrom by reduction can be used for the purposes of the invention. Saccharose, maltose, lactose, glucose, fructose, xylitol and sorbitol can preferably be considered in this respect. It will be appreciated that the various saccharides like the various metal soaps can be used as a mixture.

It has already been indicated above that the marker pencil according to the invention is comparable in terms of its external shape and its dimensions to known colored chalks. It may be for example of a cylindrical or parallelepipedic shape of a length of several centimeters, preferably for example between 3 and 5 centimeters, so that the pencil has a comparatively wide applicator surface so that, by virtue of that surface being pressed against the article on which markings or writing are to be produced, the wide line effect which the pencil according to the invention seeks to achieve can be produced without a stripe or streaky effect within the marking. The diameter or edge length of the marker pencil at the base is generally between 5 and 15 mm. As however it contains a solvent, preferably water, it is desirably provided with a suitable casing which prevents the solvent from evaporating or drying out. The casing is advantageously of such a configuration that the pencil material disposed therein can be interchanged or can be replaced by a fresh pencil member after the previous one has been used up. For that purpose the marker pencil according to the invention can be used for example in an applicator implement which is equipped with a rotary mechanism, for example of the kind described in German utility model No. 90 07 332 to which reference may be directed and which is particularly appropriate by virtue of its compact construction.

It will be noted that the marker pencil according to the invention does not give rise to a disposal problem to the extent that this is a difficulty with conventional liquid markers.

A further advantage of the marker pencil according to the invention, in comparison with liquid markers, is that it can apply thicker lines to the article or surface on which it is used, and therefore more intensive marker effects can also be achieved.

A further advantage in comparison with colored chalks is that the residual water content in the pencil material means that it is also possible to use soluble dyestuffs, with relatively low levels of concentration being adequate in that respect.

Colored chalks do not use soluble dyestuffs at all or they use only temporarily dissolved dyestuffs. Therefore, when they are brought into use, it is only possible to produce pale color shades, even when comparatively high levels of dyestuff concentration are employed.

A further advantage is that the marker pencil according to the invention can be used for marking on water-soluble inks, for example on texts or other markings made by a fountain pen, ballpoint pen or fine-liner, immediately after drying thereof, without causing smudging or blurring.

A further advantage is that rhodamines and combinations of rhodamines with other water-soluble dyestuffs fluoresce without the addition of resins or resin dispersions which are conventionally used in liquid markers.

If the pencil material of the marker pencil according to the invention has thixotropic properties, due to the composition involved, manufacture using the known processes of pencil production is possible only with some limitations as the material would liquefy under pressure in the extrusion process.

Desirably therefore the pencil material which is heated just above the dropping point is poured into suitable casings and then solidified again by cooling in the usual fashion. In order to make marker pencils refillable, it is desirable to produce marker pencil leads by casting in metal molds, preferably with a holding portion being molded thereon at the same time. The appropriate procedures to be employed in this respect are sufficiently known from the production of lip pencils, deodorant pencils and also suppository materials and the use of folding molds or high-output automatic casting equipment will therefore not be described in greater detail herein.

It is also possible to envisage using casings of wood or plastic material, which can be suitably sharpened to provide a pointed tip, and filling same in the manner described for example in relation to cosmetic pencils in DE 27 18 957 and DE 27 59 610.

EXAMPLES

Specific embodiments in regard to the composition of marker pencils according to the invention are described below, with the quantities being specified in percent by weight.

EXAMPLE 1 (yellow fluorescence)

| | |
|---|---|
| 50.000 | water |
| 38.000 | cane sugar |
| 10.000 | sodium stearate |
| 1.500 | C.I. Solvent Green 7 No. 59.040 |
| 0.500 | potassium carbonate |

That marker pencil material, without the addition of fatty substances, is distinguished by affording an intensive yellow fluorescence and a pronounced level of thixotrophy which provides for the very smooth sleek production of a stroke. As the pencil material quickly assumes a thin and runny condition, it is absorbed, like a liquid marker, into the surface of a writing or marking substrate which is suited thereto, and therefore does not just remain clinging with a greater or lesser degree of adhesion to the surface, as is the case with for example color chalks.

EXAMPLE 2 (pink)

| | |
|---|---|
| 35.000 | water |
| 35.000 | cane sugar |
| 15.000 | sodium stearate |
| 10.000 | beeswax |
| 0.500 | potassium carbonate |
| 4.500 | FIESTA NFX 13 CERISE (as a daylight fluorescent pigment) |

FIESTA NFX 13 CERISE is a trade name of the company manufacturing same, namely LANGER & CO, Post Box 1166, DE-W-2863 Ritterhude near Bremen, Germany.

EXAMPLE 3 (green)

| | |
|---|---|
| 33.500 | water |
| 50.000 | cane sugar |
| 10.000 | sodium stearate |
| 5.000 | paraffin oil |
| 1.350 | C.I. Solvent Green 7 No. 59.040 |

-continued

| | |
|---|---|
| 0.150 | C.I. Reactive Green 21 |

EXAMPLE 4 (blue)

| | |
|---|---|
| 39.500 | water |
| 35.000 | cane sugar |
| 12.000 | beeswax |
| 10.000 | sodium stearate |
| 3.000 | sodium oleate |
| 0.500 | C.I. Acid Blue 1 No. 42.045 |

This composition used an acid food dyestuff.

EXAMPLE 5 (pink)

| | |
|---|---|
| 34.800 | water |
| 20.000 | cane sugar |
| 25.000 | beeswax substitute |
| 20.000 | sodium stearate |
| 0.170 | C.I. Basic Red 1 No. 45.160 |
| 0.030 | C.I. Solvent Red 49 No. 45.170:1. |

This is a formulation with a high proportion of synthetic beeswax. The rhodamines used fluoresce without an additional resin component.

EXAMPLE 6 (orange)

| | |
|---|---|
| 40.000 | water |
| 35.000 | cane sugar |
| 10.000 | Japan wax substitute |
| 12.000 | sodium stearate |
| 1.000 | C.I. Solvent Green 7 No. 59.040 |
| 2.000 | FIESTA NFX 13 CERISE |

As indicated above, FIESTA NFX 13 CERISE is produced by LANGER & CO of Germany.

EXAMPLE 7 (black, opaque)

| | |
|---|---|
| 36.000 | water |
| 35.000 | sorbitol as a solution, 70% by weight |
| 10.000 | neutral oil |
| 14.000 | sodium stearate |
| 5.000 | C.I. Pigment Black 7 No. 77.266 |

This is a pigment-bearing formulation for applying markings, which can be washed off, to smooth surfaces.

EXAMPLE 8 (red)

| | |
|---|---|
| 47.450 | water |
| 30.000 | fructose |
| 8.000 | carnauba wax |
| 13.000 | sodium stearate |
| 1.000 | potassium stearate |
| 0.250 | C.I. Basic Red 1 No. 45.160 |
| 0.100 | C.I. Solvent Red 49 No. 45.170:1 |
| 0.200 | C.I. Basic Yellow 40 |

EXAMPLE 9 (orange)

| | |
|---|---|
| 48.920 | water |
| 27.000 | maltose |
| 10.000 | paraffin wax 52° C. |
| 13.000 | sodium stearate |

-continued

| | |
|---|---|
| 1.000 | C.I. Solvent Green 7 No. 59.040 |
| 0.050 | C.I. Basic Red 1 No. 45.160 |
| 0.03 | C.I. Solvent Red 49 No. 45.170:1 |

EXAMPLE 10 (turquoise)

| | |
|---|---|
| 40.500 | water |
| 35.000 | glucose |
| 10.000 | beeswax |
| 10.000 | sodium stearate |
| 3.000 | sodium oleate |
| 1.000 | C.I. Reactive Green 21 |
| 0.500 | C.I. Solvent Green 7 |

EXAMPLE 11 (yellow fluorescent)

| | |
|---|---|
| 38.600 | water |
| 15.000 | sorbitol as solution, 70% by weight |
| 20.000 | cane sugar |
| 15.000 | sodium stearate |
| 10.000 | Japan wax substitute |
| 1.400 | C.I. Solvent Green 7 No. 59.040 |

EXAMPLE 12 (purple)

| | |
|---|---|
| 43.700 | water |
| 35.000 | cane sugar |
| 5.000 | 1,2-propylene glycol |
| 15.000 | sodium stearate |
| 1.000 | C.I. Basic Violet 10 No. 45.170. |

The addition of glycols, more especially 1,2-propylene glycol, can improve the transparency and breaking strength of the pencil member. A composition corresponding to the foregoing Example can be considered when there is no need to lay particular stress on universal applicability for example to fax papers and non-carboning copy paper.

DESCRIPTION OF THE PREFERRED EMBODIMENTS

Figure 1:
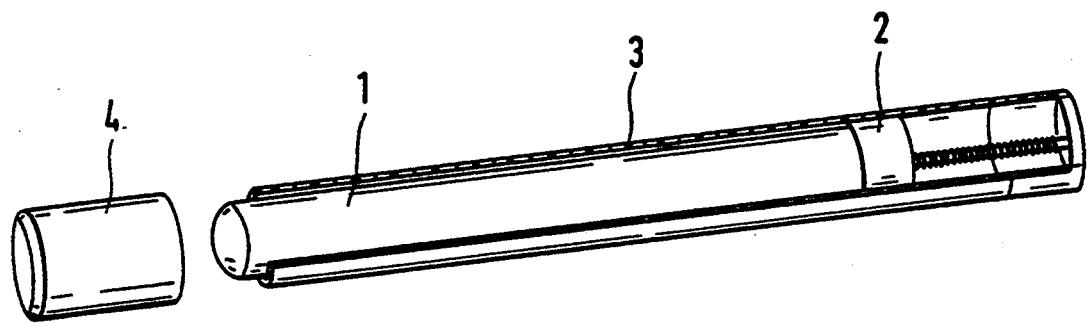
FIG. 1 is a perspective view in partial section showing use of an embodiment of a marker pencil according to the invention in a housing.
Figure 2:
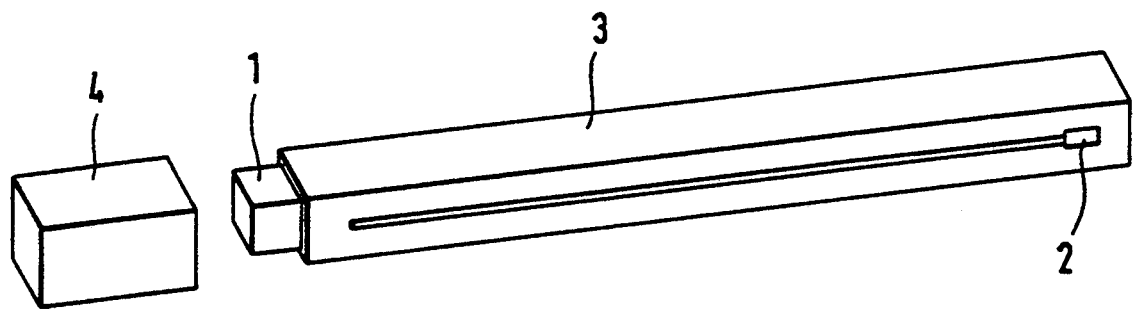
FIG. 2 is a view corresponding to that shown in FIG. 1 illustrating a further embodiment of a marker pencil.

Referring to FIGS. 1 and 2, shown therein is use of embodiments of a marker pencil 1 according to the invention, in a housing 3 which encloses same and which is fitted with an advance or forward feed mechanism as diagrammatically indicated at 2. In the embodiment shown in FIG. 1 the pencil is of a circular cross-section while the embodiment of FIG. 2 is of a square or rectangular cross-sectional shape. Reference numeral 4 in both of FIGS. 1 and 2 shows a cap of a cross-sectional shape corresponding to that of the respective housing 3. When the pencil is not in use the cap 4 can be fitted on to the applicator end thereof and thus protects the applicator end, for example to prevent it from drying out. As can be seen from the drawing the applicator end of the marker pencils according to the invention is of a blunt configuration. The size of the applicator surface area is advantageously between about 8 and 25 mm$^2$.

It will be noted that the pencil material of the marker pencils illustrated is contained in a casing which acts as protection therefor, for example to prevent it from drying out, while the pencil is interchangeably disposed in the housing.

It will be appreciated that the above-described Examples and embodiments of the marker pencil according to the invention have been set forth solely by way of example and illustration of the principles of the present invention and that various modifications and alterations may be made therein without thereby departing from the spirit and scope of the present invention.

We claim:

1. A marker pencil comprising a casing and a marking pencil material enclosed in the casing, wherein the pencil material comprises:

a dye carrier;

structure forming constituents comprising at least one water soluble metal soap in an amount of between about 5% to about 40% by weight of the pencil material, and at least one member selected from the group consisting of monosaccharides, oligosaccharides and polyols derived therefrom by reduction, in an amount of between about 5% to about 50% by weight of the pencil material; and water in an amount of between about 15% to about 65% by weight of the pencil material.

2. A marker pencil as set forth in claim 1 wherein the pencil material has thixotropic characteristics.

3. A marker pencil as set forth in claim 1 wherein the pencil material contains at least one fatty substance in an amount between of about 5% to about 25% by weight of the pencil material, said fatty substance serving as a further structure-forming constituent and to improve adhesion and reduce drying time of a pencil mark on a surface to which said pencil material is applied.

4. A marker pencil as set forth in claim 3, wherein said fatty substance is selected from the group consisting of natural wax, synthetic wax, solid triglycerides of $C_{18}$–$C_{36}$ fatty acids, liquid triglycerides of $C_6$–$C_{10}$ fatty acids, stearines, paraffin oil and vegetable oil.

5. A marker pencil as set forth in claim 3 wherein said proportion of fatty substance is between about 8 and 15% by weight.

6. A marker pencil as set forth in claim 1 wherein a proportion of metal soap is between about 8 and 20% by weight.

7. A marker pencil as set forth in claim 1 wherein a proportion of saccharide in the pencil material is between about 5 and 50% by weight.

8. A marker pencil as set forth in claim 7 wherein said proportion of saccharide is between about 25 and 40% by weight.

9. A marker pencil as set forth in claim 1 wherein a proportion of polyol in the pencil material is between about 5 and 50% by weight.

10. A marker pencil as set forth in claim 9 wherein said proportion of polyol is between about 25 and 40% by weight.

11. A marker pencil as set forth in claim 1 wherein the solvent contained in the pencil material is water and the proportion thereof in the pencil material is between about 15 and 65% by weight.

12. A marker pencil as set forth in claim 11 wherein said proportion of water is between about 30 and 40% by weight.

13. A marker pencil as set forth in claim 1 wherein a predominant proportion of the metal soap comprises sodium stearate and the pencil material further contains at least one potash soap of at least one member selected from the group consisting of saturated and unsaturated fatty acids.

14. A marker pencil as set forth in claim 1 wherein the dye carrier includes a daylight fluorescent dye.

15. A marker pencil as set forth in claim 1 wherein said casing provides means for protecting the pencil material to prevent said pencil material from drying out.

16. A marker pencil as set forth in claim 1 and further including a housing in which the pencil is interchangeably disposed, and a cap adapted to cover an applicator end of the pencil.

* * * * *